(12) United States Patent
Teague

(10) Patent No.: US 8,535,402 B2
(45) Date of Patent: Sep. 17, 2013

(54) CENTRIFUGAL PARTICLE REDUCTION SYSTEM AND METHOD

(75) Inventor: John Teague, Fort Worth, TX (US)

(73) Assignee: BDS BV (NL)

( * ) Notice: Subject to any disclaimer, the term of this patent is extended or adjusted under 35 U.S.C. 154(b) by 212 days.

(21) Appl. No.: 13/058,462

(22) PCT Filed: Aug. 11, 2008

(86) PCT No.: PCT/US2008/072746
§ 371 (c)(1),
(2), (4) Date: Feb. 10, 2011

(87) PCT Pub. No.: WO2010/019129
PCT Pub. Date: Feb. 18, 2010

(65) Prior Publication Data
US 2011/0146495 A1    Jun. 23, 2011

(51) Int. Cl.
*B01D 45/12* (2006.01)

(52) U.S. Cl.
USPC ............... 55/345; 55/337; 55/447; 55/437; 55/430; 55/432; 96/389; 96/397; 241/5; 241/39; 241/19; 241/26; 241/79.1; 241/152.1; 426/285

(58) Field of Classification Search
USPC .............. 55/337, 345, 447, 437, 430, 432; 96/389, 397; 241/5, 39, 19, 26, 79.1, 152.1; 426/285
See application file for complete search history.

(56) References Cited

U.S. PATENT DOCUMENTS

| | | | |
|---|---|---|---|
| 2,014,764 A | 9/1935 | Gram | |
| 3,143,428 A | 8/1964 | Reimers et al. | |
| 3,212,764 A * | 10/1965 | Muller et al. | 106/747 |
| 3,345,323 A | 10/1967 | Endres et al. | |
| 3,512,340 A * | 5/1970 | Friedrich et al. | 95/60 |
| 4,126,946 A | 11/1978 | Buffington et al. | |

(Continued)

FOREIGN PATENT DOCUMENTS

| | | |
|---|---|---|
| EP | 1136129 | 4/2008 |
| WO | 2008005097 | 1/2008 |
| WO | 2008016623 | 2/2008 |

OTHER PUBLICATIONS

International Search Report mailed by ISA/USA, U.S. Patent and Trademark Office on Nov. 5, 2008 for International Patent Application No. PCT/US08/72746.

(Continued)

*Primary Examiner* — Jason M Greene
*Assistant Examiner* — Dung H Bui
(74) *Attorney, Agent, or Firm* — Krueger Iselin LLP

(57) ABSTRACT

A particle reduction system and method is disclosed having an air stream accelerator, a feeder assembly, a variable speed wheel lock operably associated with the feeder assembly for releasing raw material into a conveying air stream created by the positive displacement pump, and a particle conditioning assembly. The raw material is carried by the conveying air stream through the particle conditioning assembly, where particle of the material are collided with each other for the purpose of reducing the size of the particles. In some embodiments, a non-thermal drying system can be used to extract moisture from the raw material. The moisture/solids separation occurs, in large part, due to a head-on collision of two conveying air streams. The collision creates a large squeezing force, much higher than a centrifuge or filter. This impact squeezing acts to squeeze the moisture out of the raw material.

20 Claims, 16 Drawing Sheets

(56) References Cited

U.S. PATENT DOCUMENTS

| | | |
|---|---|---|
| 4,128,404 A | 12/1978 | Stamatiou et al. |
| 4,445,976 A | 5/1984 | LaDelfa et al. |
| 4,526,804 A | 7/1985 | Escallon |
| 5,194,275 A | 3/1993 | Greer |
| 6,491,242 B1 | 12/2002 | Dingee, IV et al. |
| 6,517,015 B2 | 2/2003 | Rowley, Jr. |
| 6,588,686 B2 | 7/2003 | Dingee, IV et al. |
| 6,715,705 B2 | 4/2004 | Rowley, Jr. |
| 2004/0200910 A1 | 10/2004 | Graham et al. |
| 2008/0028633 A1 | 2/2008 | Dingee |

OTHER PUBLICATIONS

International Search Report mailed by ISA/EP, European Patent Office on Feb. 8, 2008 for International Patent Application No. PCT/US07/17147.

* cited by examiner

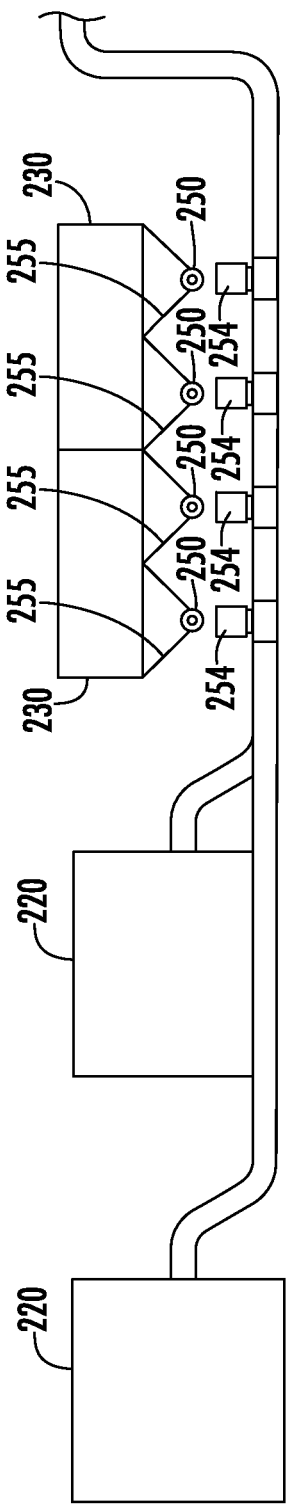

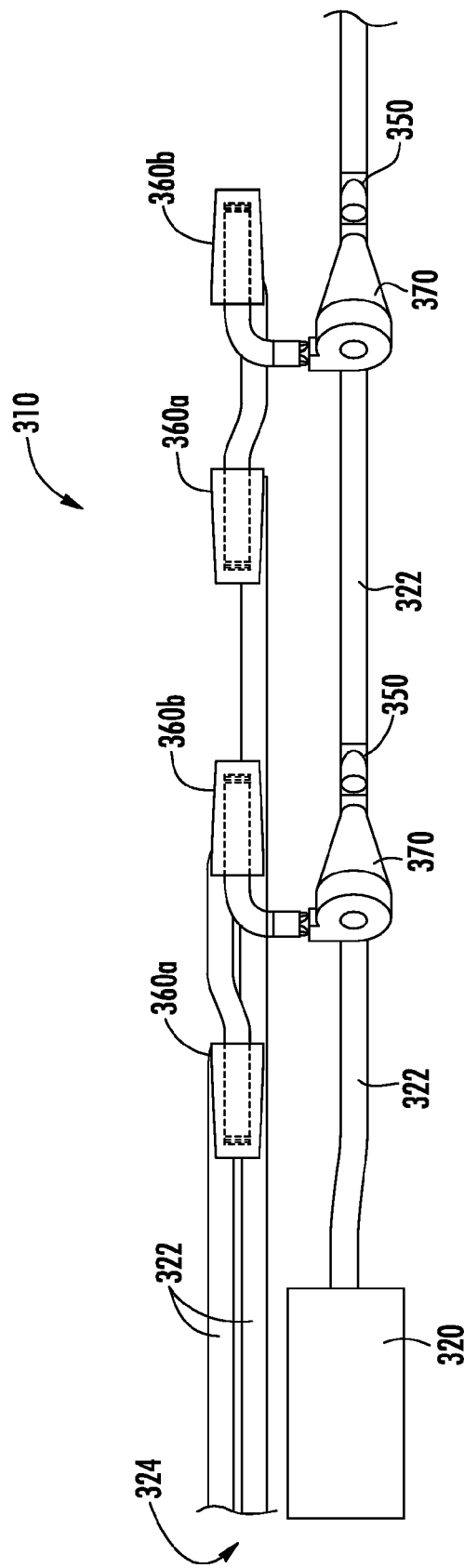

CENTRIFUGAL PARTICLE REDUCTION SYSTEM AND METHOD

TECHNICAL FIELD

The present invention relates to material reduction, separation, and classification systems. In particular, the present invention relates to material reduction systems that micronize particles.

DESCRIPTION OF THE PRIOR ART

Conventional material processing systems are known for processing waste materials having high moisture content and non-uniform particle size. Such systems typically include a blower for generating an air stream that flows through a network of ducts and a collision chamber. The waste material is introduced to the air stream, which carries the material through the collision chamber. The air stream is diverted in the collision chamber, causing the particles contained within the material to collide. These collisions usually result in a reduction in size of the larger particles contained within the waste material. The waste material is eventually blown out of the collision chamber and carried to a thermal drying assembly. Thermal drying assemblies introduce heated air to the waste material in order to evaporate the moisture contained in the waste material. The dried waste material is then output from the processing system.

A number of problems exist with such prior processing systems. Many of the problems are associated with the thermal drying process. Such thermal drying processes produce undesirable emissions, such as volatile organic compounds (VOCs). As a result, further expense and system complexity is involved to process these emissions. For example, a thermal oxidizer may have to be added to the system to treat the VOCs. Also, such thermal drying processes are a problem when trying to biomass waste materials into biofuel. For example, the lower chained alphatics are denatured by the heat, so heavy doses of polymers are required to form briquets out of the processed material.

Although these systems represent great strides in the area of material reduction systems, many shortcomings remain.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

FIG. 2B shows a side view of the initial stage shown in FIG. 2A of the centrifugal particle reduction system shown in FIG. 1;

FIG. 3A shows a top view of an embodiment of an intermediate stage of the centrifugal particle reduction system shown in FIG. 1;

DESCRIPTION OF THE PREFERRED EMBODIMENT

Disclosed herein is a system and method suitable for particle reduction, classification, and/or separation. According to some aspects of the present disclosure, wet material such as sludge or slurry can be processed to separate the moisture from the solids using a non-thermal drying process, meaning that there is no need for a heat source. By eliminating the thermal drying process found in prior system, the present system and method provides for a cleaner system that offers a number of advantages. For example, a system according to the present disclosure can be implemented that produces significantly fewer volatile organic compounds (VOCs) compared to systems incorporating thermal drying processes, thereby reducing or eliminating the need for an air-pollution processing unit, such as a thermal oxidizer. Also, the moisture removed from the solid material remains in liquid form rather than being evaporated, so it can be captured and, if necessary treated, for re-use.

Another advantage is that the solid discharge retains nutrient values better than if it had undergone a thermal drying process. In thermal drying, dissolved inorganic and organic salts scale out onto the suspended solids being dried. The inorganic salts in particular then can cause major corrosion problems if the dried suspended solids are used for fuel. In fact, there are many potential biomass to biofuel projects that are made non-economical by this corrosion. However, with the presently disclosed system and method, the moisture remains in liquid form when it is separated from the suspended solids and exits with a discharge air stream. Consequently, the dissolved solids, inorganic and organic, leave with the moisture and are not scaled out onto the dried solids end product. Also, because the lower chained alphatics are not denatured by heat and remain with the solids, they act as a polymer and help bind the solids into briquets for use as biofuel.

There are many applications where salt contents of biomass prevent the biomass from being considered as a biofuel. The presently disclosed system and method allows for the drying of the biomass in an initial pass to remove an initial percentage of the salts, then soak the dried biomass, for example to 90% moisture, then centrifuge the slurry, and then dry the centrifuge cake—effectively washing the biomass of the salts.

Figure 1:
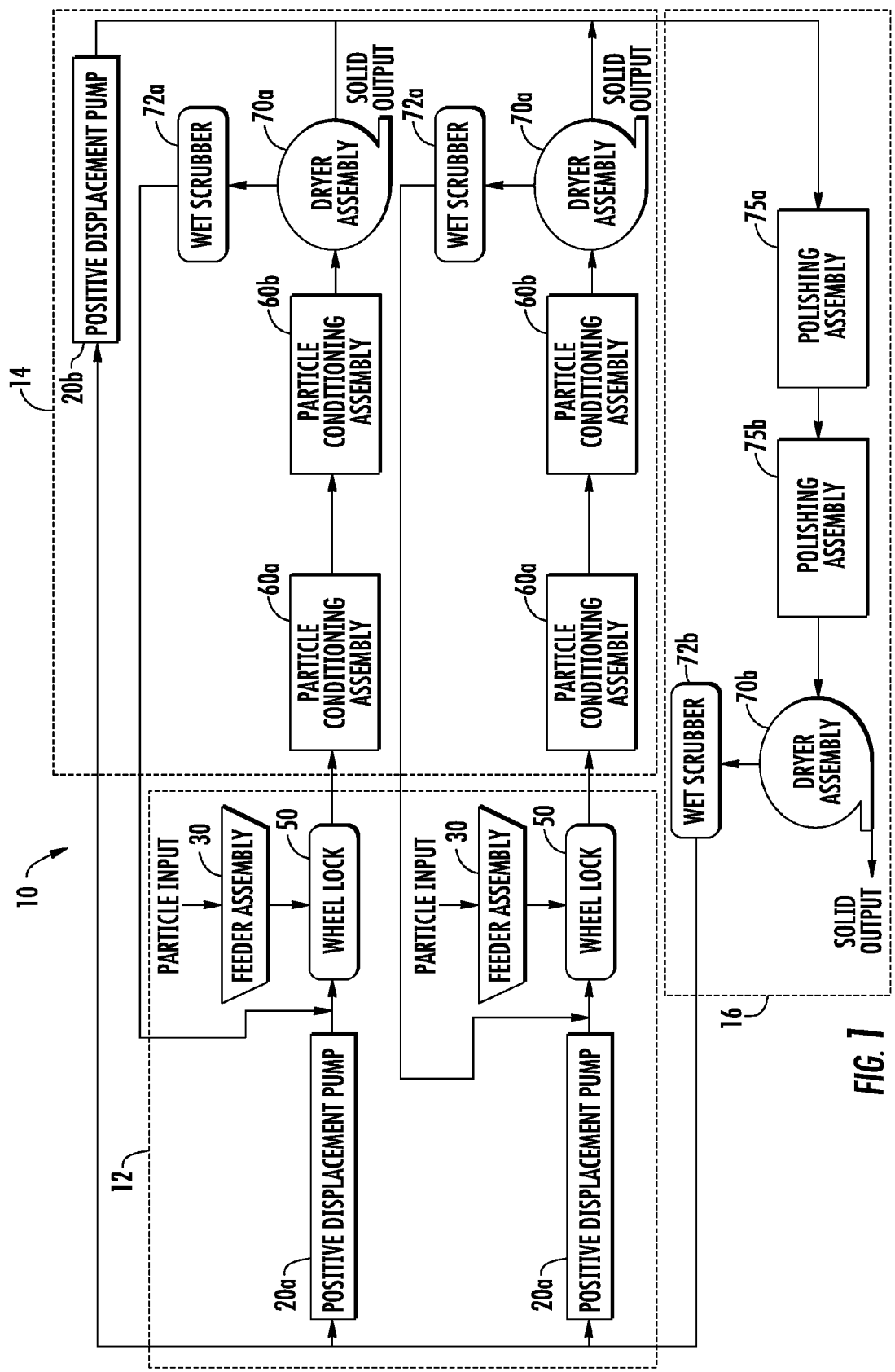
FIG. 1 is a schematic diagram of a centrifugal particle reduction system according to the present disclosure.

Referring first to FIG. 1, a schematic diagram is shown that illustrates an embodiment of a centrifugal particle reduction system 10 according to the present disclosure. As discussed above, the particle reduction system 10 is useful for particle size reduction, separation, and classification. The centrifugal particle reduction system 10 shown in FIG. 1 comprises multiple stages of components that are in fluid communication with one another as indicated in FIG. 1, for example by a conduit such as ductwork, pipe, tubing or the like. The particle reduction system 10 comprises an input stage 12, a first particle-reduction stage 14, and a second particle-reduction stage 16. In the embodiment shown in FIG. 1, the input stage 12 comprises a plurality of positive displacement pumps 20a, a plurality of feeder assemblies 30, and a plurality of wheel locks 50. The first particle-reduction stage 14 comprises a positive displacement pump 20b, a plurality of particle conditioning assemblies 60a and 60b, a plurality of dryer assemblies 70a, and a plurality of wet scrubbers 72a. The second particle-reduction stage 16 comprises a plurality of polishing assemblies 75a and 75b, a dryer assembly 70b, and a wet scrubber 72b.

In the input stage 12, raw material to be treated by the system 10 is input into the system 10 through feeder assemblies 30. Each feeder assembly 30 can include such things as an auger, a hopper, and ducts, for example according to the more detailed description provided below. The raw material is channeled from the feeder assemblies 30, through wheel locks 50, into an accelerated air flow, sometimes referred to herein as a conveying air stream, that is created by positive displacement pumps 20a. Wheel locks 50 help to maintain pressure within the centrifugal particle reduction system 10 by preventing the accelerated air in the system conduit from escaping through the feeder assemblies 30. The raw material is carried by the conveying air stream from the wheel locks 50 to the first particle-reduction stage 14.

In the first particle-reduction stage 14, the conveying air stream carries the raw material first through an upstream particle conditioning assembly 60a, then through a downstream particle conditioning assembly 60b, and then through a dryer assembly 70a. As the raw material passes through the particle conditioning assemblies 60a and 60b, the size of the particles within the raw material is gradually reduced. Moisture is then extracted and separated from these particles in the dryer assemblies 70a. This moisture/solids separation occurs, in large part, due to a head-on collision of two conveying air streams. The collision creates a large squeezing force, much higher than a centrifuge or filter. This impact squeezing in the dryer assemblies 70a acts to squeeze the moisture out of the raw material.

Note that the same high velocity also creates a centrifugal separating force in the final dryer assembly 70b, separating the moisture from the solids. Moisture and air then exit from one opening in the dryer assembly 70b, and the dried solids exit from another opening. For example, in some embodiments of the dryer assembly, such as those described in greater detail below, moisture and the accelerated air stream exit from the top of the dryer assembly 70, and the dried solids drop out of the bottom.

The moisture and air from the dryer assemblies 70 are conveyed to one or more wet scrubbers 72a, 72b which separate the moisture from the air. The accelerated air is then reconveyed back through one or more of the positive displacement pumps 20.

Before the raw material arrives at the final dryer assembly 70b, the material can be conveyed through one or more polishing assemblies 75a and 75b. As the material passes through the polishing assemblies 75a and 75b, the size of the particles within the raw material is further reduced in size.

Note that alternative embodiments can include more or fewer positive displacement pumps 20, can include more or fewer particle conditioning assemblies 60, and can include more, fewer, or none of the polishing assemblies 75.

More specific embodiments of each of the stages 12, 14, and 16 will now be described in greater detail. An embodiment of the input stage 12 is shown in greater detail in FIGS. 2A-2E; an embodiment of the first particle-reduction stage 14 is shown in greater detail in FIGS. 3A-3C; and an embodiment of the second particle-reduction stage 16 is shown in greater detail in FIGS. 4A-4C.

Figure 2A:
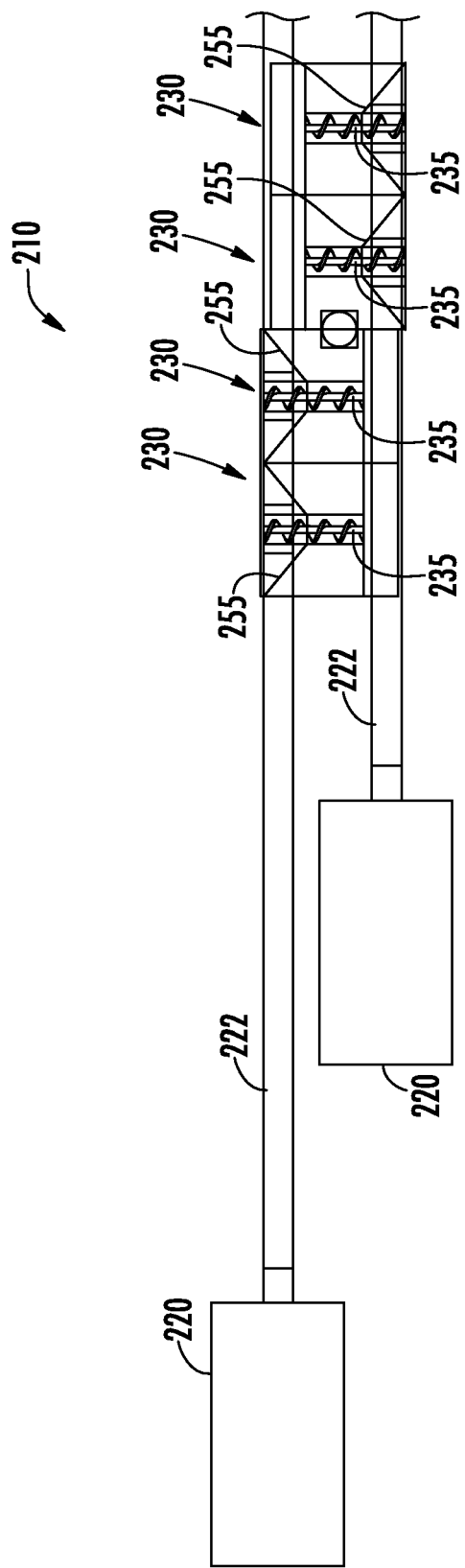
FIG. 2A shows a top view of an initial stage of the centrifugal particle reduction system shown in FIG. 1.

Referring first to FIGS. 2A and 2B, FIGS. 2A and 2B show top and side views, respectively, of an input stage 210, which serves as an embodiment of the input stage 12 of the centrifugal particle reduction system 10 shown in FIG. 1. The input stage 210 comprises a plurality of positive displacement pumps 220. Each of the pumps 220 is connected via conduit 222 to one or more respective feeder assemblies 230 and wheel locks 250. Each feeder assembly 230 includes a hopper 255 and an auger 235.

Each of the positive displacement pumps 220 operates to push gas, for example ambient air, through the various conduits 222, thereby creating the conveying air stream through the conduit 222. Alternatively, vacuum systems and/or various other types of pumps can be used in place of, or in combination with, to push and/or pull gas through the conduit 222.

In some embodiments, each of the positive displacement pumps 220 is operable to provide a gasflow of over 1000 cubic feet per minute (CFM), for example in a range of 3000 CFM to 6000 CFM, or in a range of 4000 CFM to 5000 CFM. In one implementation of the system shown in FIG. 1, positive displacement pumps 220 provide 4700 CFM through conduit having a diameter of approximately 10 inches.

Raw material is input into a feeder assembly 230 by placing the material into a hopper 255. The hopper 255 acts to funnel material towards the auger 235. The auger 235 grinds the raw material, thereby reducing the size of the particles within the raw material until it is sufficiently small enough to further progress through the wheel lock 250. Once particles have been conveyed through augers 235, wheel locks 250 convey particles to ducts 254 to facilitate their release into the conveying air stream within the conduit 222.

Figure 2C:
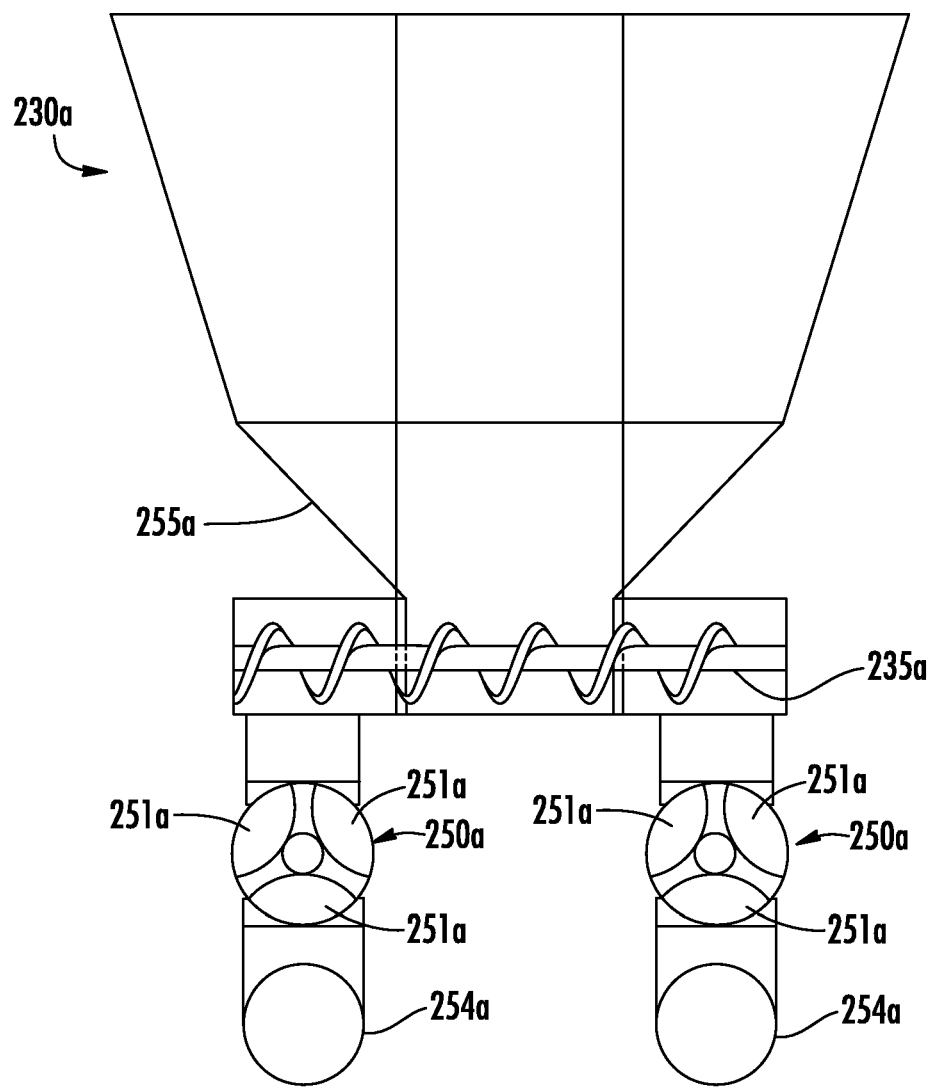
FIG. 2C shows a side view of a first embodiment of a feeder assembly.

FIG. 2C shows feeder assembly 230a, which serves as an example of a first embodiment of the feeder assembly 230. Feeder assembly 230a comprises a hopper 255a, an auger 235a, and a plurality of wheel locks 250a. Ducts 254a are shown adjacent to the feeder assembly 230a and in fluid communication with the wheel locks 250a. The ducts 254a are in fluid communication with positive displacement pump 220 and serve as conduit through which the conveying air stream can flow from positive displacement pump 220.

In this embodiment, the auger 235a is at least substantially horizontally positioned and drives raw material towards the wheel locks 250a. The hopper 255a has an inner chamber open to the auger 235a so that raw material fed into the hopper 255a is channeled towards the auger 235a. The auger 235a can be driven, for example using a motor (not shown), to rotate about an axis extending along its longitudinal shaft, and includes a number of blades about the shaft for breaking up the raw material and driving the raw material towards the wheel locks 250a.

The wheel locks 250a also rotate about respective longitudinal axes. In this embodiment, each wheel lock 250a has an axis of rotation that is at least substantially perpendicular to the axis of rotation of the auger 235a. The wheel locks 250a each include a plurality of cavities 251a that extend in a longitudinal direction that is at least substantially parallel to the axis of rotation of the respective wheel lock 250a. The cavities 251a are filled with raw material when facing the hopper 255a and discharge the raw material into the conveying air stream when facing the ducts 254a.

Figure 2D:
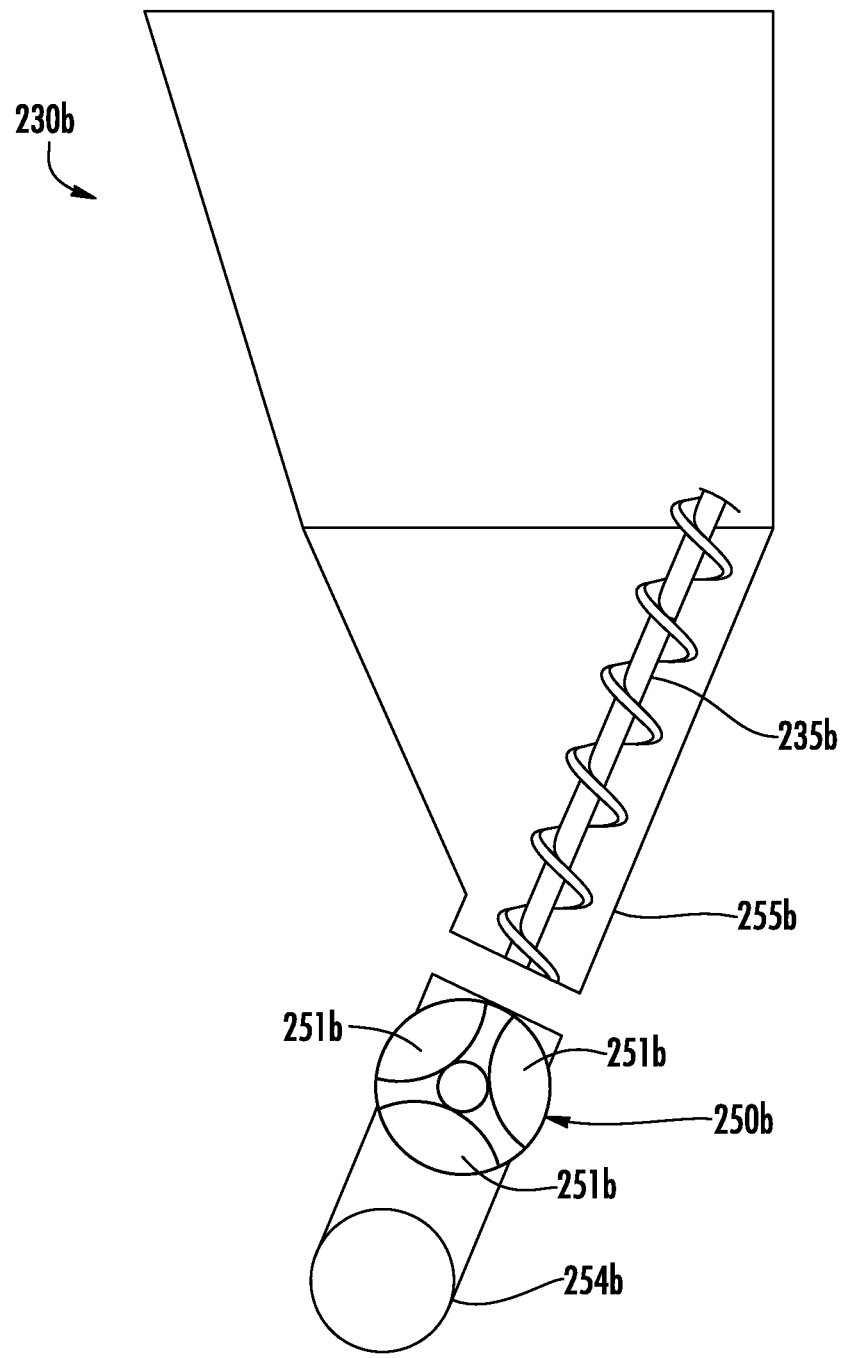
FIG. 2D shows a side view of a second embodiment of a feeder assembly.

FIG. 2D shows feeder assembly 230b, which serves as an example of a second embodiment of the feeder assembly 230. Feeder assembly 230b comprises a hopper 255b, an auger 235b, and at least one wheel lock 250b. Duct 254b is shown adjacent to the feeder assembly 230b and in fluid communication with the wheel locks 250b. The duct 254b is in fluid communication with positive displacement pump 220 and serves as conduit through which the conveying air stream can flow from positive displacement pump 220.

In this embodiment, the auger 235b extends upwardly into the inside of the hopper 255b and drives the raw material in the hopper 255b towards the wheel lock 250b. The auger 235b is oriented so as to allow material input into the hopper 255b to self-compress, thereby allowing for an increased amount of material input. That is to say, as material is input into the feeder assembly 230b and accumulates within hopper 255b, the weight of the material assists in compressing the material towards auger 235b and eventually through the wheel lock 250b. The auger 235b can be driven, for example using a motor (not shown), to rotate about an axis extending along its longitudinal shaft, and includes a number of blades about the shaft for breaking up the raw material and driving the raw material towards the wheel lock 250b.

The wheel lock 250b also rotates about its longitudinal axis. In this embodiment, the wheel lock 250b has an axis of rotation that is at least substantially perpendicular to the axis of rotation of the auger 235b. The wheel lock 250b includes a plurality of cavities 251b that extend in a longitudinal direction that is at least substantially parallel to the axis of rotation of the wheel lock 250b. The cavities 251b are filled with raw material when facing the hopper 255b and discharge the raw material into the conveying air stream when facing the duct 254b.

Figure 2E:
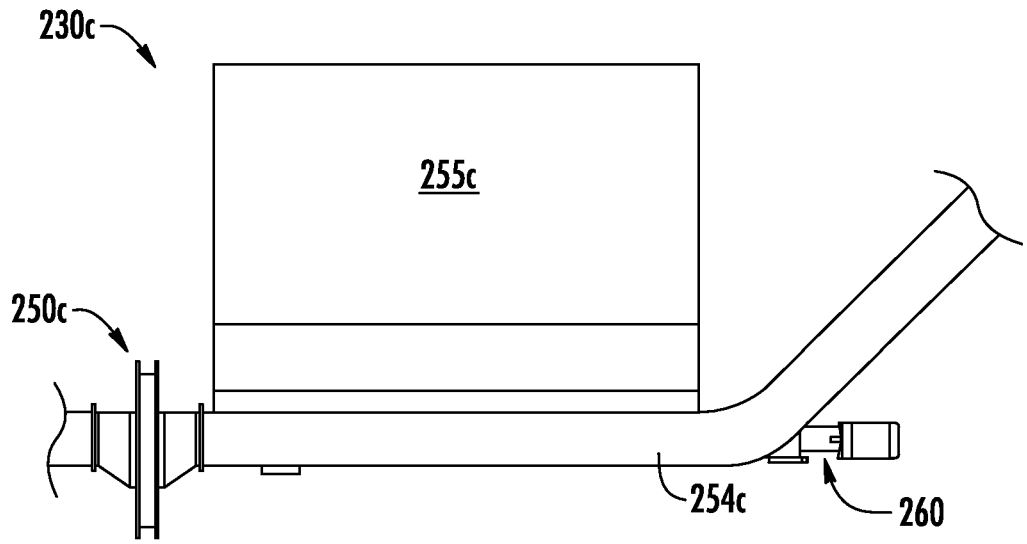
FIG. 2E shows a side view of a third embodiment of a feeder assembly.
Figure 2F:
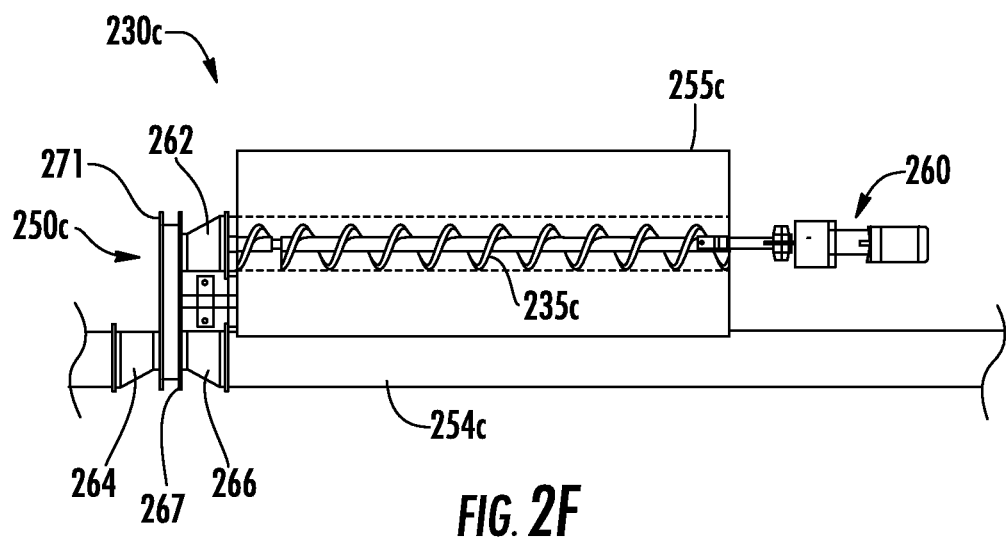
FIG. 2F shows a top view of the feeder assembly shown in FIG. 2E.

FIGS. 2E-2H show feeder assembly 230c, which serves as a third embodiment of the feeder assembly 230. FIG. 2E shows a side view of the feeder assembly 230c, and FIG. 2F shows a top view of the feeder assembly 230c. Feeder assembly 230c comprises a hopper 255c, an auger 235c disposed within the hopper 255c, and a wheel lock assembly 250c. The auger 235c is driven to rotate by a drive assembly 260, which can include a motor or the like capable of rotating the auger 235c. The rotation of the auger 235c acts to drive material within the hopper 255c toward the wheel lock assembly 250c. Material is input into the wheel lock assembly 250c via an inlet duct 262. The wheel lock assembly 250c transfers the input material to the main duct 254c. The conveying air stream generated by one or more of the positive displacement pumps 20 travels through the wheel lock assembly 250c, coming in through duct 264 and exiting through duct 266. The wheel lock assembly 250c is designed to direct the conveying air stream from duct 264 to duct 266 and prevent the air stream from exiting through duct 262. The wheel lock assembly 250c places input material from the hopper 255c into the path of the conveying air stream traveling from duct 264 to duct 266. This causes the material to travel with the conveying air stream out of the wheel lock assembly 250c towards the duct 266 and main duct 254c.

Figure 2G:
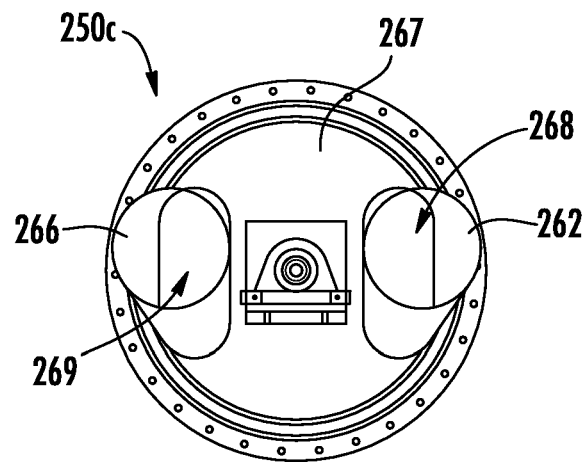
FIG. 2G shows a side view of a wheel lock assembly for the feeder assembly shown in FIGS. 2E and 2F.

FIG. 2G shows a side view of the wheel lock assembly 250c. More specifically, the side view shown in FIG. 2G is the side facing the hopper 255c in FIGS. 2E and 2F. The wheel lock assembly 250c includes a first side plate 267 having an input port 268 and a through port 269. A second side plate 271 is provided on the opposite side of the wheel lock assembly 250c. The second side plate 271 can be identical to the first side plate 267, with an important difference being that the second side plate 271 includes a through port opposite the through port 269 but does not include a port opposite the input port 268. The first side plate 267 and second side plate 271 define opposing sides of an inner chamber of the wheel lock assembly 250c. The inner chamber of the wheel lock assembly 250c is preferably sealed from the outside of the wheel lock assembly 250c except for the through ports 269 and input port 268.

Figure 2H:
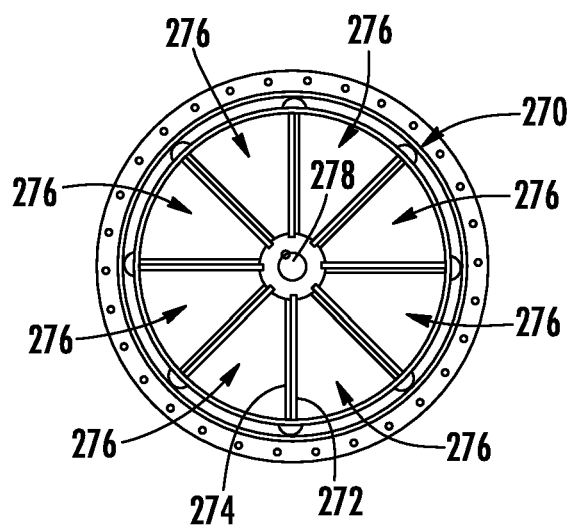
FIG. 2H shows a side view of a rotating wiper assembly for the wheel lock assembly shown in FIG. 2G.

FIG. 2H shows a side view of a rotating wiper assembly 270 that is disposed within an inner chamber of the wheel lock assembly 250c. The wiper assembly 270 includes a plurality of rigid arms 272 and a plurality of wipers 274, each wiper 274 being attached to a respective arm 272. The wipers 274 are wide enough to span the inner chamber between the inner side of the first side plate 267 and the inner side of the second side plate 271. The wipers 274 are preferably formed of a rigid material having high abrasion resistance and a low coefficient of friction, for example ultra high molecular weight polyethylene (UHMW). The rigid arms 272 can be formed of a rigid material, for example metal such as steel.

The wipers 274 divide the inner chamber of the wheel lock assembly 250c into a plurality of discrete pockets 276 that are substantially sealed from each other. The wiper assembly 270 rotates about a center axis at hub 278. As material is input into the inner chamber through the input port 268, the material is disposed within one or more of the pockets 276 that are aligned with the input port 268 at the time. As the wiper assembly 270 continues to rotate, the pocket or pockets 276 containing the input material eventually align with the through ports 269. At this point, the conveying air stream traveling through the through ports 269 propels the material out of the wheel lock assembly 250 to the ducts 266 and 254c.

Figure 3B:
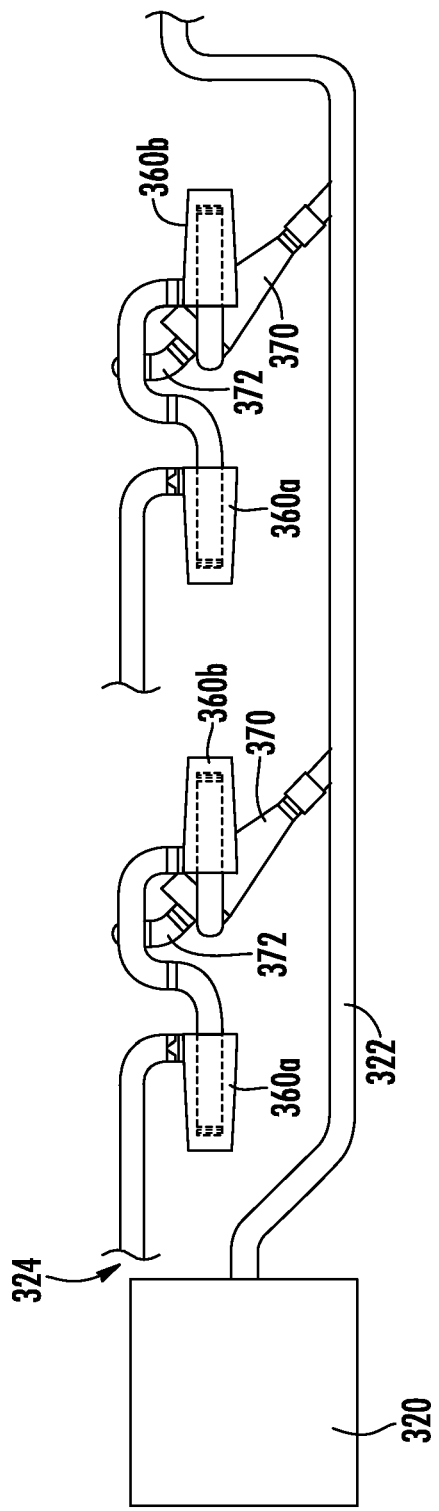
FIG. 3B shows a side view of the intermediate stage shown in FIG. 3A of the centrifugal particle reduction system shown in FIG. 1.

Referring next to FIGS. 3A and 3B, FIG. 3A shows a top view of a particle reduction stage 310, and FIG. 3B shows a side view of the particle-reduction stage 310. The particle-reduction stage 310 serves as an embodiment of the first particle-reduction stage 14 of the centrifugal particle reduction system 10 shown in FIG. 1. The particle-reduction stage 310 comprises a plurality of particle conditioning assemblies 360, a plurality of dryer assemblies 370, and a positive displacement pump 320, all of which are connected via conduit 322 as shown.

As shown and described above in connection with FIG. 1, after raw material has been input into the system, it is conveyed from the input stage 12 to a particle-reduction stage such as the particle-reduction stage 310. In the embodiment shown, raw material is conveyed into the particle-reduction stage 310 at the input end 324 of the conduit 322 and carried by the conveying air stream through particle conditioning assemblies 360 and dryer assembly 370.

While the raw material particles are conveyed through the particle conditioning assemblies 360, particle collisions occur and cause a reduction in the size of the material particles. The particle conditioning assemblies 360 can each include one or more vibrating mechanisms for vibrating the particle conditioning chamber 360. Such vibrations are useful for disturbing moisture-laden particles that accumulate on the inside surfaces of the particle conditioning chamber 360, causing them to be dislodged from the wall and discharged from the chamber 360 by the conveying air stream. Additionally, air-stream obtrusions such as plates, blocks, or other objects can be disposed within the particle conditioning chamber 360 in order to disturb the air stream and, as a result, cause additional particle collisions to occur, thereby enhancing the particle reduction process. A more detailed description of an embodiment of the particle conditioning assemblies 360 is described below.

After the material particles have passed through the particle conditioning assemblies 360, the material particles are received by the dryer assembly 370. The dryer assembly 370 is configured for extracting and separating moisture from the solid particles in the raw material. This moisture/solids separation occurs, in large part, due to a head-on collision of two conveying air streams—the conveying air stream carrying the material from the conditioning chambers 360 to the dryer assembly 370, and the conveying air stream generated by positive displacement pump 320 and passed through conduit 322 which is in fluid communication with both of the dryer assemblies 370. The collision creates a large squeezing force, much higher than a centrifuge or filter. This impact squeezing in the dryer assemblies 370 acts to squeeze the moisture out of the raw material. Moisture and air is forced out of the top of the dryer assembly 370 through duct 372, which carries the air and moisture to a wet scrubber. Dried or at least partially-dried particles having a moisture content that has been reduced since entering the dryer assembly 370 exit through the bottom of the dryer assembly 370 and enter the conveying air stream flowing through the conduit 322.

Figure 4A:
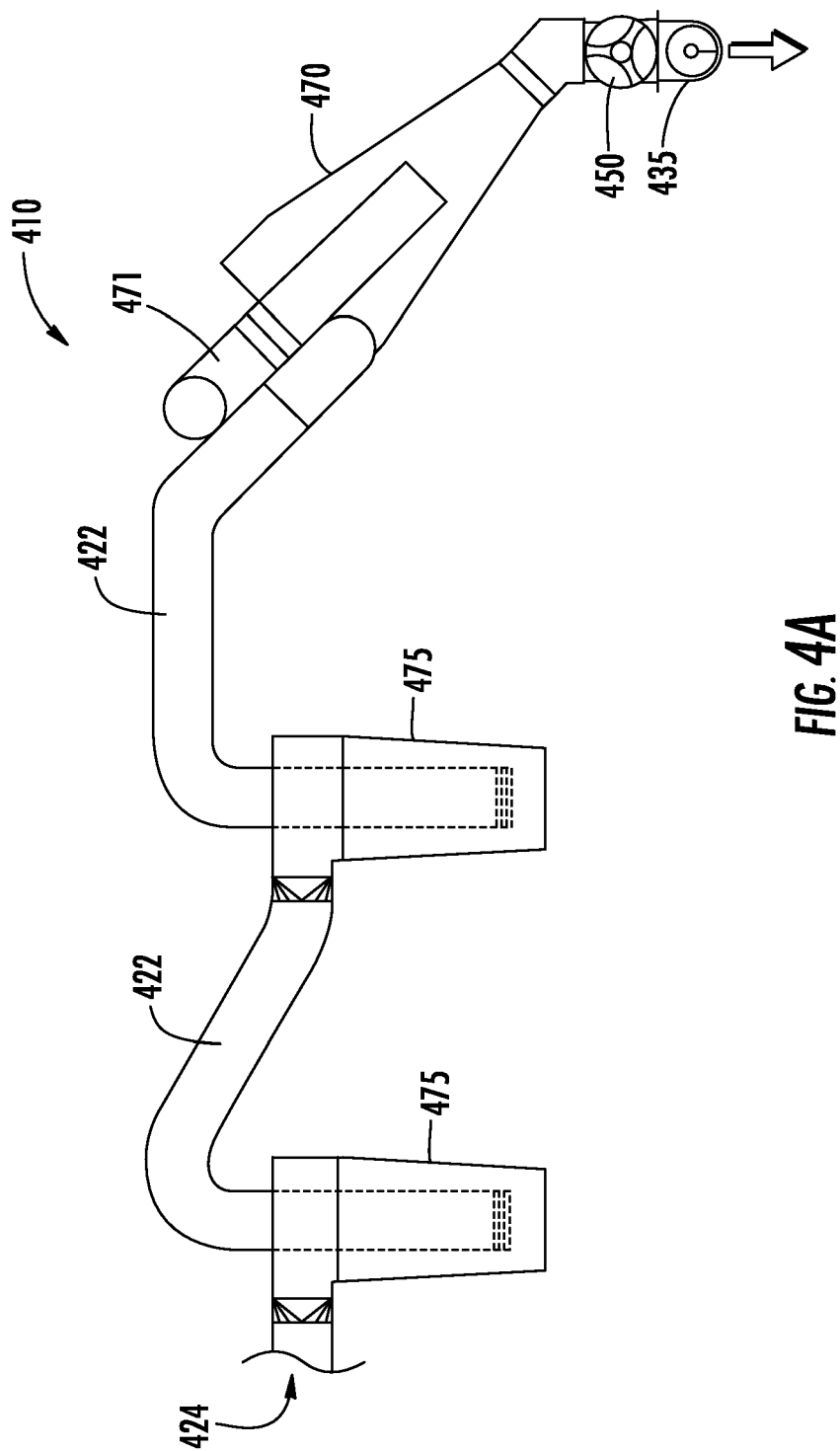
FIG. 4A shows a side view of an embodiment of the final stage of the centrifugal particle reduction system shown in FIG. 1.
Figure 4B:
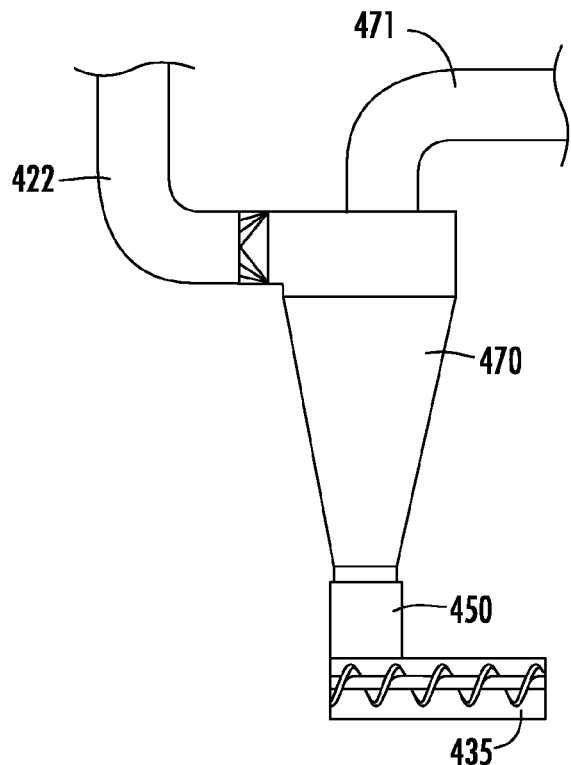
FIG. 4B shows a front view of a dryer assembly for the final stage shown in FIG. 4A of the centrifugal particle reduction system shown in FIG. 1.

Referring next to FIGS. 4A and 4B, FIG. 4A shows a side view of a particle-reduction stage 410, and FIG. 4B shows a partial front view of the particle-reduction stage 410. The particle-reduction stage 410 serves as an embodiment of the second particle-reduction stage 16 of the centrifugal particle reduction system 10 shown in FIG. 1. The particle-reduction stage 410 comprises a plurality of polishing assemblies 475, a dryer assembly 470, a wheel lock 450, and an auger 435, all of which are connected via conduit 422 as shown.

As shown and described above in connection with FIG. 1, after material has been conveyed from the first particle-reduction stage 14, it is conveyed to a second particle-reduction stage such as the particle-reduction stage 410. In the embodiment shown, material is conveyed into the particle-reduction stage 410 at the input end 424 within the conduit 422 and towards polishing assemblies 475.

As particles of material are channeled through polishing assembly 475, additional particle collisions occur that further reduce the size of the particles. Vibrating mechanisms may be operatively associated with the periphery of polishing assembly 475 to further assist in reducing the size of the particles.

In the illustrated embodiment, particles are passed through first and second polishing assemblies 475 that are disposed in series such that the second polishing assembly 475 allows for additional particle size reduction. Alternative embodiments can include any number of polishing assemblies.

The high-velocity conveying air stream creates a centrifugal separating force in the final dryer assembly 470, separating most of the remaining moisture from solids in the conveyed material. Moisture and air then exit from the top of the dryer assembly 470 through conduit 471, which carries the moisture and air to a wet scrubber. The dried solids drop out of the bottom through a wheel lock 450 and auger 435.

The moisture and air from the dryer assembly 470 is conveyed to a wet scrubber that separates the moisture from the air. The air is then reconveyed back through one or more of the positive displacement pumps 20 and the moisture is discharged from the system.

Figure 5:
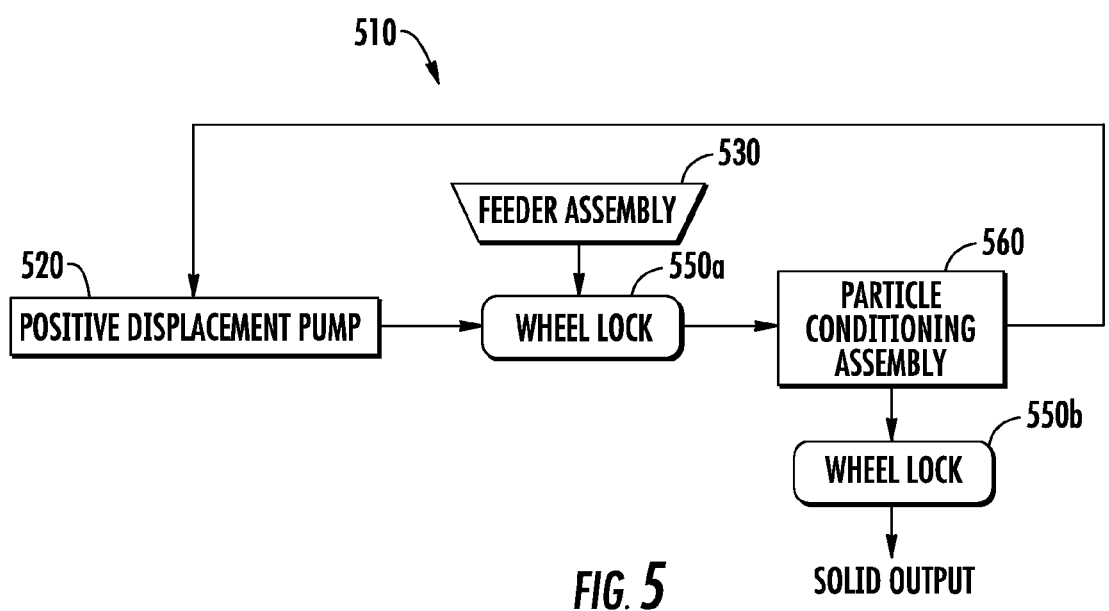
FIG. 5 shows a schematic view of an alternative embodiment of a centrifugal particle reduction system.

Referring next to FIG. 5 in the drawings, a schematic view of a centrifugal particle reduction system 510 according to an alternative embodiment of the present application is illustrated. The embodiment shown in FIG. 5 illustrates a more simplified example of a centrifugal particle reduction system compared to the embodiment shown in FIG. 1. The centrifugal particle reduction system 510 includes a positive displacement pump 520, a feeder assembly 530, a first variable speed wheel lock 550a, a particle conditioning assembly 560, and a second variable speed wheel lock 550b all connected by conduit as shown.

Flow is created by positive displacement pump 520. Particles enter centrifugal particle reduction system 510 by being placed into feeder assembly 530. After being conveyed through feeder assembly 530, particles are conveyed into variable speed wheel lock 550 and then released into a fluid flow created by the positive displacement pump 520. Flow created by positive displacement pump 520 in turn conveys the particles into the particle conditioning assembly 560. Solid particles that are small enough to escape centrifugal particle reduction system 510 are left behind in particle conditioning assembly 560 and allowed to escape the centrifugal particle reduction system 510 through the variable speed wheel lock 550. Particles which are not sufficiently reduced are conveyed back into the fluid flow created by the positive displacement pump 520, and then reconveyed through the centrifugal particle reducer 510. This process can thus be repeated until the particles are sufficiently reduced to exit the centrifugal particle reduction system 510.

Figure 6A:
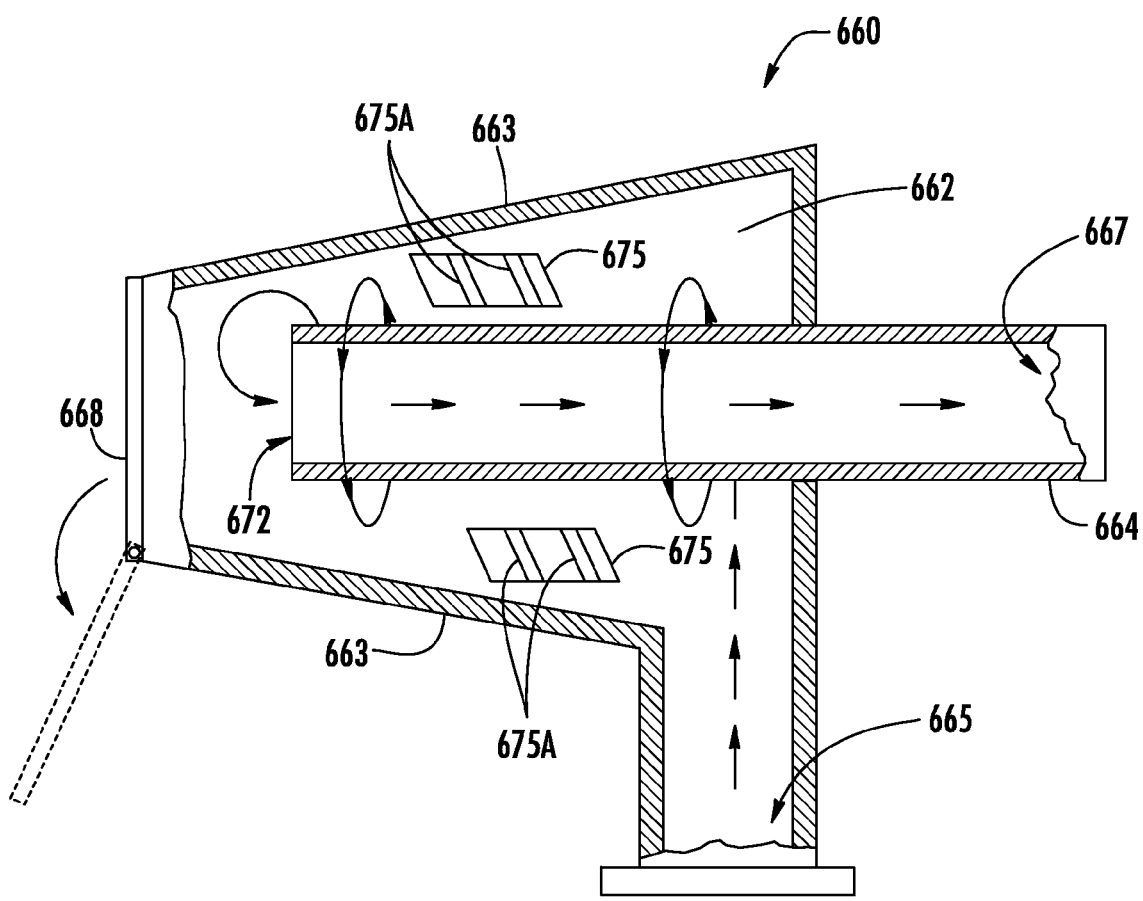
FIG. 6A shows a cross-sectional view of an embodiment of a particle conditioning chamber suitable for use with the presently disclosed centrifugal particle reduction system.

Referring now to FIG. 6A in the drawings, a cross-sectional view of a particle conditioning assembly 660 is illustrated. The particle conditioning assembly 660 serves as an example of an embodiment of the particle conditioning assemblies 60a, 60b, 360a, 360b, 560. Particle conditioning assembly 660 includes an annular inner chamber 662 defined by side wall 663, an end wall 668, and a hollow shaft 664 disposed within the conditioning assembly 660. The shaft 664 is proximally separated from end wall 668 so as to minimize head loss. Annular chamber 662 and end wall 668 are attached so as to be capable of transmitting vibrations therebetween. Annular chamber 662 has an input opening 665, through which raw material carried by the conveying air stream enters the annular chamber 662 of the particle conditioning assembly 660. The end wall 668 helps to direct the flow into the hollow shaft 664. The hollow shaft 664 has an output opening 667 through which the raw material carried by the conveying air stream exits the particle conditioning assembly 660.

The end wall 668 can be hingedly attached, or otherwise capable of being opened or removed, allowing the end wall 668 to serve as an access door. During normal operation, the end wall 668 is in the closed position shown in solid lines. When the system is not operating, the end wall 668 can be opened to the position shown in phantom. This allows access to the chamber 662, for example for cleaning, for adjusting the length of the shaft 664 (as described below), or for other maintenance.

The distance between the end wall 668 and the hollow shaft 664 is spaced for minimizing head loss and entraining particle flow. Additionally, the distance between annular chamber 662 and hollow shaft 664 dictates the degree to which particle reduction occurs within the chamber 662. The present particle conditioning assembly 660 is provided with an adjustable hollow shaft 664, which allows for the particle conditioning assembly 660 to be tuned according to different particle reduction needs. Alternatively, or in addition to providing a shaft having an adjustable length, other adjustable provisions can be provided for adjusting the distance between the end wall 668 and the shaft 664.

Figure 6B:
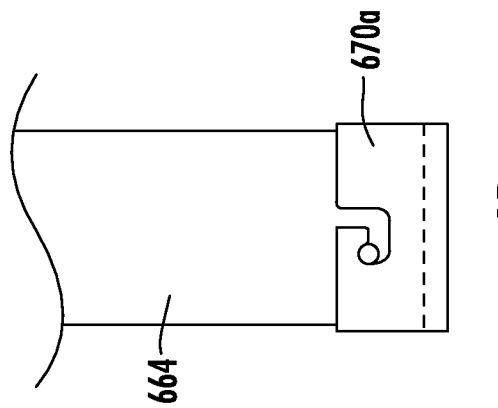
FIGS. 6B-6D show side views of an adjustable assembly for the particle conditioning chamber shown in FIG. 6A.
Figure 6C:
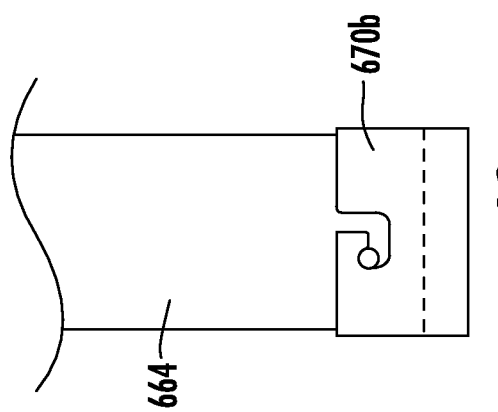
Figure 6D:
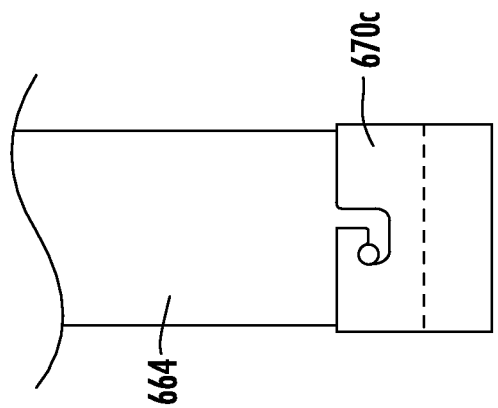

Referring now also to FIGS. 6B-6D, according to one embodiment the length of the shaft 664 can be adjusted by selecting from among a plurality of sleeves 670 having respective lengths. For example, FIG. 6B shows a first sleeve 670a removably attached to the shaft 664, FIG. 6C shows a second sleeve 670b removably attached to the shaft 664, and FIG. 6D shows a third sleeve 670b removably attached to the shaft 664. The second sleeve 670b is longer than the first sleeve 670a, and the third sleeve 670c is longer than the second sleeve 670b. Still further sleeves 670 can be provided having various other respective lengths. The length of the shaft 664 can thus be adjusted (thereby adjusting the distance between the shaft 664 and end wall 668) by replacing the sleeve 670b with a longer or shorter sleeve 670, which effectively becomes an operable part of the shaft 664. In the illustrated embodiment, the sleeves 670 are removably attached using a twist-lock attachment system; however, other attachment means can be used. For example, the sleeves 670 can be threaded onto the shaft 664 or attached using latches or other fasteners.

Referring again to FIG. 6A, the end wall 663 may be conically shaped as depicted or may take any other form, so long as airflow is capable of being transmitted. Also, hollow shaft 664 may be generally rounded as depicted or may take another shape such having a conical orientation, so long as airflow may be transmitted. End wall 668 may be flat as depicted, or in other embodiments, may be concave, convex, or be curved at any other angle so long as airflow may be transmitted from annual chamber 662 to hollow shaft 664.

The conveying air stream enters particle conditioning assembly 660 generally normal to or generally tangential to the orientation of annual chamber 662 or hollow shaft 664. Hollow shaft 664 may be generally aligned with the orientation of annular chamber 662, or may deviate substantially therefrom. Also, more than one airflow may enter and exit annular chamber 662, as other embodiments may have additional openings 665 and additional hollow shafts 664.

The side wall 663 and end wall 668 are capable of vibrating or having a vibrating device attached to them. In some embodiments, a regular vibrating mechanism may be coupled to the side wall 663 and/or the end wall 668. In other embodiments, an ultrasonic vibrating mechanism may be coupled to the side wall 663 and/or the end wall 668. In certain embodiments an Etrema CU18 magnetorestrictive transducer may be coupled to the side wall 663 and/or the end wall 668 for transmitting vibrations.

The path followed by raw material and the conveying air stream through the particle conditioning assembly 660 is as follows: the material and air enters through opening 665, travels around the hollow shaft 664 several times while at the same time approaching the end wall 668, enters the hollow shaft 664 at opening 672, travels the length of hollow shaft 664, then exits the conditioning assembly 660 at opening 667.

As raw material carried by the conveying air stream enters the particle conditioning assembly 660 through opening 665, particles of the raw material begin to collide with one another as they are entrained to flow about the shaft 664 and along the annular chamber 662. The generally tangential orientation of opening 665 relative to side wall 663 allows for a smooth transition into the existing flow regime. If opening 665 is oriented generally normal to the location of annular chamber 662, the transition into the existing flow regime is not as smooth, but additional particle collisions may occur. The side wall 663 is generally conical, gradually decreasing the amount of available space between the side wall 663 and the shaft 664 closer to the opening 672 in the shaft. This means that as particles travel towards the opening 672 in the shaft, the volume of space in which particles can flow is gradually decreased, which results in a gradual increase in the number of particle collisions. Also, the interior side of the wall 663 can be provided with one or more air-stream obstructions such as blocks 675. Such obstructions disturb the airstream as it cycles around the outside of the shaft 664, causing an increased number of particle collisions. In some embodiments, the blocks 675 can include one or more grooves 675a, which create eddies and thereby cause an increased number of particle collisions. In embodiments that include a vibrating device for vibrating the side wall 663 and/or end wall 668, vibrations in the side wall 663 and/or end wall 668 assist in removing particle buildup on the inner side of the side wall 663 and/or end wall 668.

In some embodiments, end wall 668 and/or side wall 663 can have an additional opening smaller than hollow shaft 664 to allow sufficiently conditioned particles to escape annular chamber 662, and maintain insufficiently conditioned particles within annular chamber 662.

Figure 7:
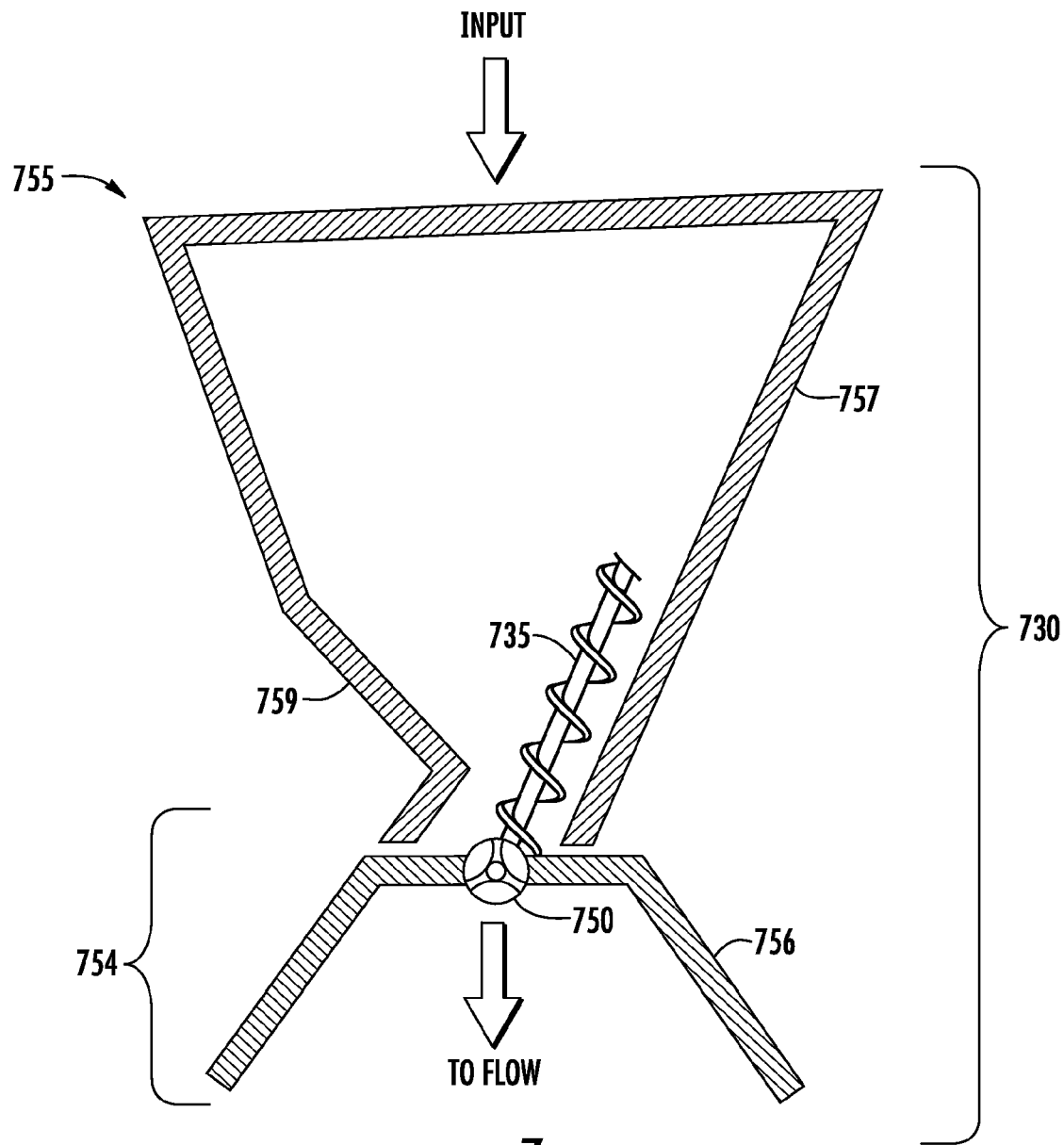
FIG. 7 shows a cross-sectional view of an embodiment of a feeder assembly and variable speed wheel lock suitable for use with the presently disclosed centrifugal particle reduction system.

Referring now to FIG. 7, a side view of an embodiment of a feeder assembly 730 is illustrated. The feeder assembly 730 has a hopper 755, an auger 735, and a variable speed wheel lock 750. Variable speed wheel lock 750 has a duct 754, to facilitate particulate input into the conveying air stream created by positive displacement pump 20. Hopper 755 has walls 757 and 759 formed in a generally conical manner for allowing particulate to funnel towards auger 735. Variable speed wheel lock 750 is positioned below auger 735 to allow particles that have been reduced in size to be released into the flow. Duct 754 is shaped in a generally inverted conical fashion to allow a maximum distribution of particles into the flow. Auger 735 is positioned relative to hopper 755 to allow for particle accumulation in hopper 755 to assist in compressing particles towards auger 735. Walls 757 and 759 of hopper 755 and walls 756 of duct 754 are capable of vibrating, transmitting vibrations, and capable of having a vibrating mechanism attached to them. In alternate embodiments an ultrasonic vibrator may be attached to walls 757 and 759 of hopper 755 and walls 756 of duct 754. In certain embodiments an Etrema CU18 magnetorestrictive transducer may be employed to transmit vibrations.

In some embodiments, hopper 755 and duct 754 may be shaped in a generally tubular fashion. Additionally, other embodiments each hopper 755 may employ multiple ducts 754 and multiple augers 735. Augers 735 may be positioned to convey particles towards variable speed wheel lock 750 or may be positioned within hopper 755 to reduce particles. Augers 735 may churn, rotate, or revolve in any position, direction, or manner.

Raw material is input into the feeder assembly 730. Auger 735 rotates, in turn compacting the raw material that is too large to pass through wheel lock 750, and conveys the raw material towards wheel lock 750. Wheel lock 750 opens intermittently, and releases reduced particles into the conveying air stream. The duct 754 assists in releasing particles into the conveying air stream by releasing particles about the orientation of wall 756, which is contoured to transition into the conduit. As the raw material accumulates within the feeder assembly 730, particles of the raw material compress against one another, walls 757 and 759 of hopper 755, and auger 735. As particle compression occurs, the weight of the particles and shape and orientation of walls 757 and 759 assist auger 735 in compacting and breaking down the size of the particles and funneling them towards the wheel lock 750.

Figure 8:
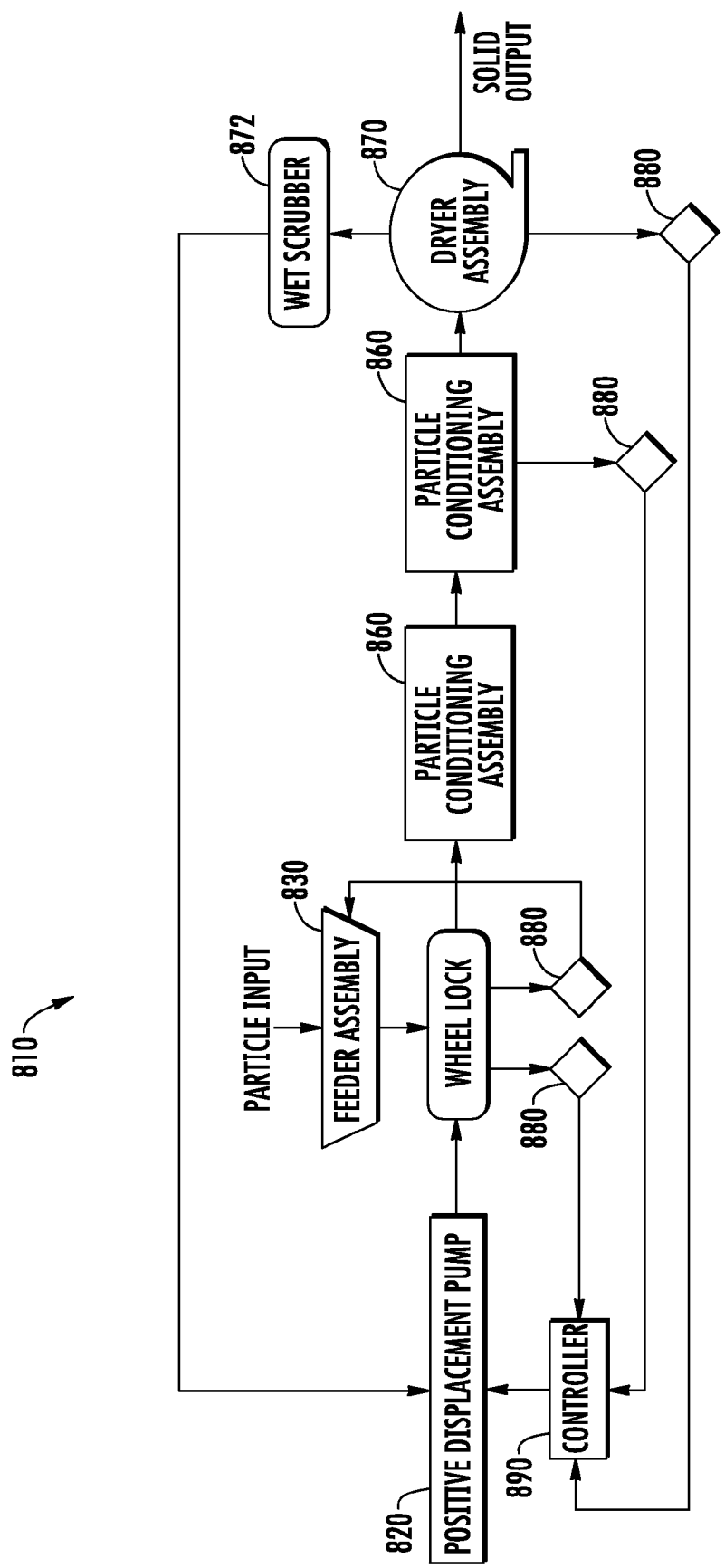
FIG. 8 shows a schematic view of another alternative embodiment of a centrifugal particle reduction system.
Figure 9:
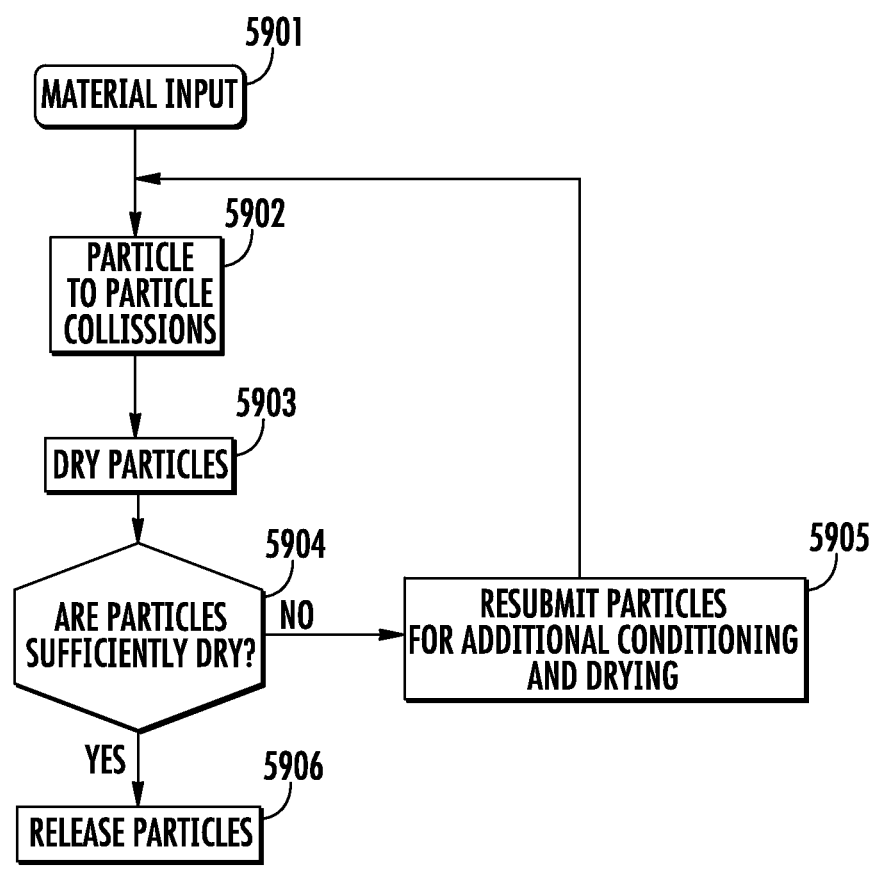
FIG. 9 shows a flow chart of an embodiment of a process for particle reduction.

Referring next to FIG. 8 in the drawings, a centrifugal particle reducer 810, having feedback transmitters 880 and an electronic controller 890 is illustrated. A positive displacement pump 820 is operatively associated with a feeder assembly 830, a variable speed wheel lock 850, two particle conditioning assemblies 860, a drying chamber 870, bidirectional feedback transmitters 880, and a controller 890. Components of the centrifugal particle reducer 810, including the positive displacement pump 820, feeder assembly 830, variable speed wheel lock 850, particle conditioning assemblies 860, drying chamber 870, and wet scrubber 872, can be implemented according to embodiments described above.

As positive displacement pump 820 conveys particles through centrifugal particle reducer 810, variances occur throughout the system. Accordingly, feedback transmitters 880 may be located throughout the system to detect and convey these variances, while controllers 890 may be utilized to control other components capable of compensating for such variances.

Raw material is input into feeder assembly 830 and released via wheel lock 850 into a conveying air stream created by positive displacement pump 820. Feedback transmitter 880 is configured to detect and convey data associate with wheel lock 880 and feeder assembly 830. For example, feedback transmitter 880 can be configured to collect, create, and/or transmit data representative of whether wheel lock 880 needs to open or close, and/or representative of a need to adjust the rate at which wheel lock 770 opens and closes, for example according sensors that can detect the accumulation of particles within feeder assembly 830.

Due to the opening and closing of wheel lock 850, pressure variances occur as particles are released into the stream. Accordingly, feedback transmitter 880 and controller 890 can be connected between wheel lock 850 and positive displacement pump 820. As pressure changes occur during the release of raw material into the conveying air stream, feedback transmitter 880, in concert with one or more sensors for sensing these pressure changes, can convey these variances to controller 890. In turn, the controller 890 can be configured to respond appropriately, for example by adjusting the operational rate of positive displacement pump 820.

As raw material is released into the conveying air stream by wheel lock 850, the raw material is conveyed through an initial particle conditioning assembly 860 and a subsequent particle conditioning assembly 860. Feedback transmitter 880 is employed to collect and transmit data associated with the particle conditioning assembly 860 to the controller 890, which in turn is configured to adjust the operation of the positive displacement pump 820. Accordingly, if it is detected that the particle conditioning assembly 860 is not sufficiently reducing the size of the particles, an appropriate signal may be conveyed to indicate that the rate at which the positive displacement pump 820 is operating needs to be increased or decreased.

Similarly, feedback transmitter 880 may be connected between dryer assembly 870 and controller 890. As particles are dried, feedback transmitter 880 can be configured to convey associated data to controller 890. For example, feedback transmitter 880 can be configured to detect and convey to controller 890 the temperature inside dryer assembly 870. For example, if feedback transmitter 880 senses that the dryer assembly 870 is operating at a greater temperature than anticipated, perhaps due to friction occurring within the system, data representative of this event can be transmitted to the controller 890, which in turn can be configured to adjust the operation of the positive displacement pump 820 as necessary. Additionally or alternatively, feedback transmitter 880 can be configured to detect and convey data representative of the rate at which particles are leaving dryer assembly 870, the size of the particles within the dryer assembly 870, and/or the moisture content within the dryer assembly 870 to controller 890. The controller 890 can be configured to receive such data and take appropriate action if necessary. For example, if feedback transmitter 880 conveys data to controller 890 representative of a situation wherein the moisture content of particles leaving dryer assembly 870 is not sufficient, controller 890 can be configured to react by adjusting the operation of the positive displacement pump 820 as necessary. Similarly, if feedback transmitter 880 conveys data to the controller 890 representative of a situation wherein the rate or size of particles leaving the dryer assembly 870 is insufficient or undesirable, the controller 890 can be configured to react by adjusting the operation of the positive displacement pump 820 as necessary.

Referring next to FIG. 9, a flow chart is shown depicting an embodiment of a process for particle reduction. At block S901, raw material is input into a fluid flow. This can be achieved using a feeder assembly and wheel lock assembly as described in various embodiments above. Next at block S902, the raw material input at block S901 is reduced in size. After particles are reduced at block S902, particles are dried at block S903. After being dried at block S903, the moisture content of the particles is measured at block S904. If the particles are inadequately reduced of moisture, they are resubmitted for additional drying and conditioning at block S905. If the particles have are adequately free of moisture, they are allowed to be released from the drier at block S906.

In some embodiments, at block S901 an auger can be employed to initially reduce materials so materials may be input into a conveying air stream that carries the particles through a centrifugal particle reducer. In some embodiments, at block S901 a vibrating mechanism can be employed to assist in funneling materials towards an auger. In some embodiments, at block S902 vibrating mechanisms may be coupled to the particle conditioning chamber to transmit vibrations into a fluid flow through which particles are being conveyed. In some embodiments, at block S902 obstructing elements such as blocks or plates can be attached about the walls of a particle conditioning chamber to further particle reduction as described above. In some embodiments, at block S902 material can be conveyed the length of the particle conditioning chamber to allow for additional particle to particle collisions. In some embodiments, at block S903 as the particles are dried, the moisture content can be conveyed through a feedback transmitter, to inform and adjust various other components of the centrifugal particle conditioning chamber. In some embodiments, at block S904 the moisture content may be measured at incremental nodes to allow only particles of specified moisture contents to be released from the drier at block S906 or reconveyed for additional conditioning and drying at block S905.

In addition to the foregoing, it should be understood that an auger 35 and a hopper 55 need not necessarily be oriented or shaped as such in alternate embodiments. Any auger 35 may be maneuvered at any angle relative to any variable speed wheel lock 50 or any hopper 55. Additionally, a hopper 55 may be shaped in any manner so long as particles may pass through it. Additionally, it should be understood that in alternate embodiments, the variable speed wheel lock 50 may be positioned before or after the feeder assembly 30.

Also, any positive displacement pump 20, feeder assemblies 30, variable speed wheel locks 50, particle conditioning assemblies 60, dryer assemblies 70, variable speed wheel locks 50, or polishing assembly 75 may be shaped to any form, including being generally triangularly formed, trapezoidally formed, circularly formed, so long as they may accommodate particles.

Any number of feeder assemblies 30 may be employed. Each feeder assembly 30 may be associated with any number of augers 35 or any number of hoppers 55. Additionally, each feeder assembly 30 may be associated with any number of variable speed wheel locks 50. Each hopper 55 may be associated with any number of augers 35. Furthermore, each feeder assembly 30 need not necessarily be operably associated with a variable speed wheel lock 50.

While this particular embodiment depicts particles flowing through a minimum of two particle conditioning assemblies 60 before flowing through a drying mechanism 70, it should be understood this embodiment is not limited. For example, particles could be passed through one or more particle conditioning assemblies 60 before being passed through one or more drying chambers 70. In other embodiments, particles may be passed only through one or more particle conditioning chambers 60 without being passed into any drying chambers 70. Yet in other embodiments, particles may be passed through one or more drying chambers 70 without being passed through any particle conditioning chambers 60.

Furthermore, it should be understood that the relative sequence of any particle conditioning assembly 60 and any drying chamber 70 is not limited. Any particle conditioning assembly 60 may be followed by any number of particle conditioning assemblies 60 or any number of drying chambers 70. Any drying chamber 70 may be followed in sequence by any number of drying chambers 70 or any number of particle conditioning chambers 60.

This embodiment also depicts multiple positive displacement pumps 20. It should be understood that the number, sequence, and location of the positive displacement pumps 20 should not be construed as limiting and that any number of positive displacement pumps 20 may be located in any sequence relative to any other component. It should be understood that any number of a positive displacement pumps 20 may be used to create airflow.

Additionally, it should be understood that the position, location, and number of augers 35 is not limited. If should be understood that an auger 35 may precede or follow. the location other member of the centrifugal particle reducer 10 equipment, including, but not limited to, a particle conditioning assembly 60, a drying mechanism 70, a variable speed wheel lock 50, or an auger 35.

Still in other embodiments, any number of positive displacement pumps 20, feeder assemblies 30, variable speed wheel locks 50, particle conditioning assemblies 60, or dryer assemblies 70, variable speed wheel locks 50, hoppers 55, and augers 35 may be employed and connectively related positive displacement pumps 20, feeder assemblies 30, variable speed wheel locks 50, particle conditioning assemblies 60, or dryer assemblies 70, variable speed wheel locks 50, hoppers 55, and augers 35.

For example, particles may be released from hopper 55 and auger 35, past a variable speed wheel lock 50 sent into an additional passage, distributed by an additional auger 35, and then passed through an additional variable speed wheel lock 50, before being released into the flow.

Alternatively, particles may be conveyed from a dryer assembly 70 into another dryer assembly 70, through an auger 35, and then a variable speed wheel lock 50 before being conveyed into a feeder assembly 30.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A centrifugal particle reduction system, comprising:
   an air stream accelerator for accelerating a gas, thereby providing a conveying air stream;
   a feeder assembly for receiving input material comprising a plurality of particles;
   a wheel lock assembly for transferring the input material from the feeder assembly to the conveying air stream; and
   a particle conditioning assembly for receiving the input material and conveying air stream, the particle conditioning assembly having an annular chamber and a hollow shaft disposed at least partially within the annular chamber,
   wherein the particle conditioning assembly is arranged such that the input material first passes through the annular chamber and then passes through the hollow shaft before exiting the particle conditioning assembly.

2. The centrifugal particle reduction system of claim 1, wherein one or more vibrating mechanisms assist particle reduction by vibrating the feeder assembly.

3. The centrifugal particle reduction system of claim 1, wherein one or more vibrating mechanisms assist particle reduction by vibrating the particle conditioning assembly.

4. The centrifugal particle reduction system of claim 1, wherein the particle conditioning assembly further comprises a side wall and an end wall, wherein the hollow shaft includes an opening that faces the end wall through which the input material enters the hollow shaft.

5. The centrifugal particle reduction system of claim 4, wherein the distance between the opening of the hollow shaft and the end wall is adjustable.

6. The centrifugal particle reduction system of claim 4, wherein the end wall is hingedly connected to the side wall.

7. The centrifugal particle reduction system of claim 4, further comprising an air stream obstruction supported by the side wall.

8. The centrifugal particle reduction system of claim 1, further comprising a non-thermal dryer assembly for separating moisture from solids within the input material.

9. The centrifugal particle reduction system of claim 8, wherein the dryer assembly comprises first and second openings, wherein the dryer assembly receives the input material and the conveying air stream through a first opening, and wherein the second opening of the dryer assembly is in fluid communication with a second conveying air stream.

10. The centrifugal particle reduction system of claim 9, wherein the dryer assembly further comprises a third opening for allowing moisture and air to exit the dryer assembly, and wherein input material from which the moisture was extracted exits the dryer assembly through the second opening.

11. The centrifugal particle reduction system of claim 1, wherein the air stream accelerator comprises a positive displacement pump.

12. The centrifugal particle reduction system of claim 1, wherein the wheel lock assembly comprises: first and second opposing side plates that at least partially define an inner chamber, the first side plate having an input port and a first through port, and the second side plate having a second through port; and a rotating wiper assembly disposed within the inner chamber for transferring material received through the input port in the first side plate to the conveying airstream passing through the first and second through ports.

13. The centrifugal particle reduction system of claim 1, further comprising a feedback transmitter and a controller, wherein the transmitter is configured to transmit data to the controller representative of one or more operating conditions of at least one of the air stream accelerator, the feeder assembly, the wheel lock assembly, and the particle conditioning assembly.

14. A centrifugal particle reduction system, comprising:
- an air stream accelerator for accelerating a gas, thereby providing a conveying air stream;
- a feeder assembly for receiving input material comprising a plurality of particles;
- a wheel lock assembly for transferring the input material from the feeder assembly to the conveying air stream;
- a particle conditioning assembly for receiving the input material and conveying air stream, the particle conditioning assembly being configured for encouraging collisions between the particles of the input material; and
- a non-thermal dryer assembly for separating moisture from solids within the input material.

15. The centrifugal particle reduction system of claim 14, wherein the dryer assembly comprises first and second openings, wherein the dryer assembly receives the input material and the conveying air stream through a first opening, and wherein the second opening of the dryer assembly is in fluid communication with a second conveying air stream.

16. The centrifugal particle reduction system of claim 15, wherein the second conveying air stream is generated by a second air stream accelerator.

17. The centrifugal particle reduction system of claim 15, wherein the dryer assembly further comprises a third opening for allowing moisture and air to exit the dryer assembly, and wherein input material from which the moisture was extracted exits the dryer assembly through the second opening.

18. A particle conditioning assembly, comprising:
- a side wall that defines an outer surface of an annular chamber, the side wall including at least one opening;
- an end wall contacting the side wall and enclosing one end of the annular chamber; and
- a hollow shaft that defines an inner surface of the annular chamber, an end of the shaft most proximate to the end wall defining a distance between the shaft end and the end wall,
- wherein the at least one opening directs an air stream conveying particles into the annular chamber and the shaft directs the air stream conveying particles out of the annular chamber, the direction of the air stream moving into the annular chamber being different than the direction of the air stream moving out of the annular chamber; and
- wherein the annular chamber causes a reduction in size of at least some of the particles passing through the annular chamber by inducing particle collisions.

19. The particle conditioning assembly of claim 18, wherein the distance between the shaft end and the end wall is adjustable.

20. The particle conditioning assembly of claim 18, further comprising one or more air stream obstructions supported by the side wall, said air stream obstructions positioned and shaped to cause an increased number of particle collisions as compared to a particle conditioning assembly without such air stream obstructions.

* * * * *